United States Patent [19]
Baker et al.

[11] Patent Number: 5,857,565
[45] Date of Patent: Jan. 12, 1999

[54] PAPERBOARD ENVELOPE FOR A COMPUTER DISC OR CD WHICH IS INSERTABLE IN A BOUND PUBLICATION

[75] Inventors: Mark P. Baker, Allen County, Ind.; Richard E. House, Kane County, Ill.

[73] Assignee: Arthur Meyer

[21] Appl. No.: 916,210

[22] Filed: Aug. 22, 1997

[51] Int. Cl.$^6$ .................................................. B65D 85/57
[52] U.S. Cl. ...................... 206/232; 206/308.1; 229/313
[58] Field of Search ................................ 206/232, 308.1, 206/311–313; 229/80–83, 307, 309–316; 283/56

[56] References Cited

U.S. PATENT DOCUMENTS

| | | | |
|---|---|---|---|
| 271,413 | 1/1883 | Busse | 229/310 |
| 1,446,232 | 2/1923 | Wilburger | 206/311 |
| 2,145,500 | 1/1939 | Townsend . | |
| 3,279,594 | 10/1966 | Worthington, III | 206/312 |
| 3,369,732 | 2/1968 | Hanson . | |
| 3,507,444 | 4/1970 | Werby . | |
| 3,561,671 | 2/1971 | Minot . | |
| 3,675,844 | 7/1972 | Sorrell | 206/813 |
| 4,549,658 | 10/1985 | Sfikas . | |
| 4,570,416 | 2/1986 | Shoenfeld . | |
| 4,640,413 | 2/1987 | Kaplan et al. . | |
| 4,741,475 | 5/1988 | Norman . | |
| 5,002,220 | 3/1991 | Safranski | 229/80 |
| 5,141,252 | 8/1992 | Michlin . | |
| 5,232,150 | 8/1993 | Solomons . | |
| 5,269,563 | 12/1993 | Michlin . | |
| 5,462,160 | 10/1995 | Youngs . | |
| 5,568,942 | 10/1996 | Stevens . | |
| 5,590,912 | 1/1997 | Stevens . | |
| 5,638,953 | 6/1997 | House | 206/308.1 |
| 5,694,743 | 12/1997 | Beighle | 206/232 |

FOREIGN PATENT DOCUMENTS

| | | |
|---|---|---|
| 656592 | 7/1986 | Switzerland . |

*Primary Examiner*—Jim Foster
*Attorney, Agent, or Firm*—Paul M. Denk

[57] ABSTRACT

An envelope adapted to hold a disc such as a computer disc or a CD and being adapted to be bound into a spine of a publication. The envelope is formed from a blank and has a front face, a back face, a top edge, a bottom edge, and side edges. One of the side edges is formed from the fold in the blank. Margins are formed around the remaining side edges, the margins defining an area sized to accept the disc. Adhesive strips are provided in the side and bottom margins to glue the front and back faces of the envelope together so that the envelope will be sealed along three of the four sides and opened along the top edge. A flap is provided in the top margin in the front face. The flap can be bent away from the back face to allow for access to the area. A peel-and-seal strip is placed in the top margin to seal to opened edge once the disc has been inserted in the area. A tear strip is provided in the flap to facilitate removal of the disc from the envelope. The side margin is sufficiently wide to space the disc from the spine of the publication to permit the envelope to be bound into the spine of the publication.

3 Claims, 2 Drawing Sheets

5,857,565

PAPERBOARD ENVELOPE FOR A COMPUTER DISC OR CD WHICH IS INSERTABLE IN A BOUND PUBLICATION

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates to envelopes sized to accept discs, such as computer discs, computer CDs, music CDs, etc., and in particular, to such an envelope which may be incorporated into a magazine or the like.

Publishers of magazines and books, especially magazines and books related to computers and software, often include computer disks with the publications. Currently, publishers of books typically glue a sleeve to the inside of the back cover of the book, or wrap the book in cellophane, to package a disc with the book. Periodicals which include discs are typically wrapped in cellophane to prevent the disc from separating from the magazine during shipment of the magazine.

BRIEF SUMMARY OF THE INVENTION

One object of the present invention is to provide an envelope for a disc which can be bound into a publication.

Another object is to provide such an envelope in which the disc is easily removed from the envelope by a consumer.

An envelope adapted to hold a disc such as a computer disc or a CD and being adapted to be bound into a spine of a publication. The envelope is formed from a blank and has a front face, a back face, a top edge, a bottom edge, and side edges. One of the side edges is formed from the fold in the blank. Margins are formed around the remaining side edges, the margins defining an area sized to accept the disc. Adhesive strips are provided in the side and bottom margins to glue the front and back faces of the envelope together so that the envelope will be sealed along three of the four sides and opened along the top edge. A flap is provided in the top margin in the front face. The flap can be bent away from the back face to allow for access to the area. A peel-and-seal strip is placed in the top margin to seal to opened edge once the disc has been inserted in the area. A tear strip is provided in the flap to facilitate removal of the disc from the envelope. The side margin is sufficiently wide to space the disc from the spine of the publication to permit the envelope to be bound into the spine of the publication.

BRIEF DESCRIPTION THE SEVERAL VIEWS OF THE DRAWINGS

FIG. 1 is a perspective view of an envelope of the present invention bound in to a publication, such as book or magazine;

FIG. 2 view of a blank which forms the envelope;

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention.

A envelope 1 is adapted to be bound into a publication P such as a book or a periodical after a disc 2 has been placed in the envelope. As the envelope 1 is bound into the spine S of the publication P, the envelope 1 will be secured in the publication, and the publication may be transported or mailed without the need to wrap the publication, for example, in cellophane, to prevent the disc falling out of the publication.

Figure 1:
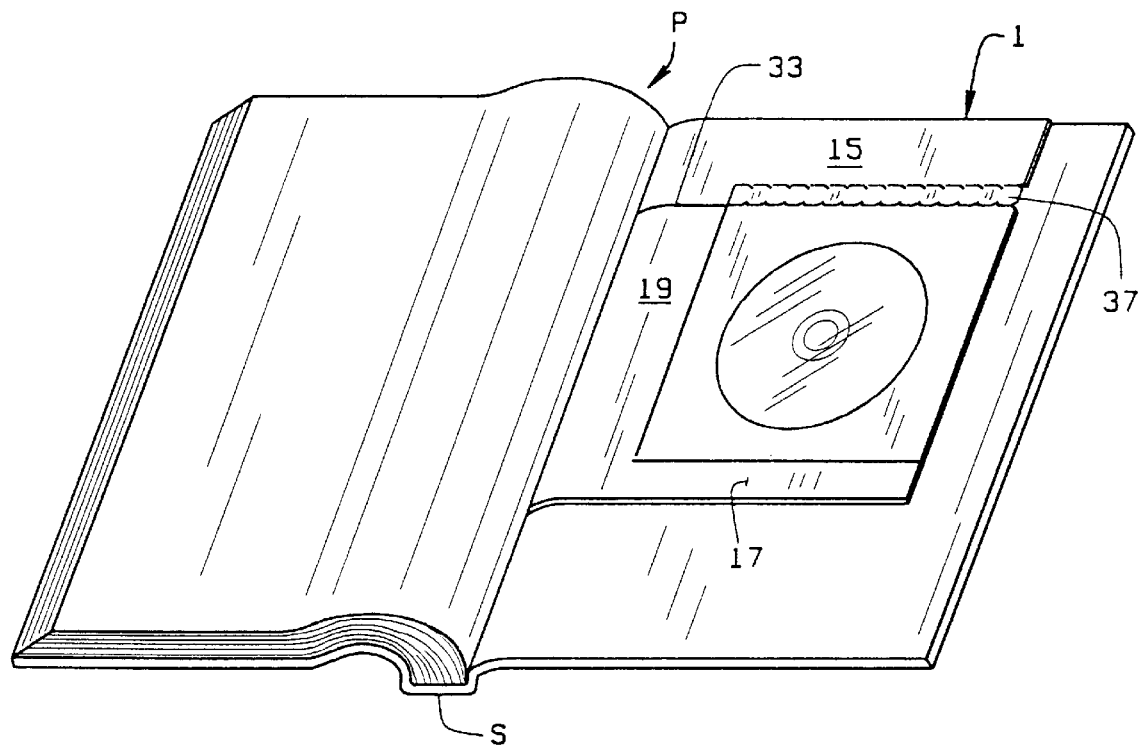
Figure 2:
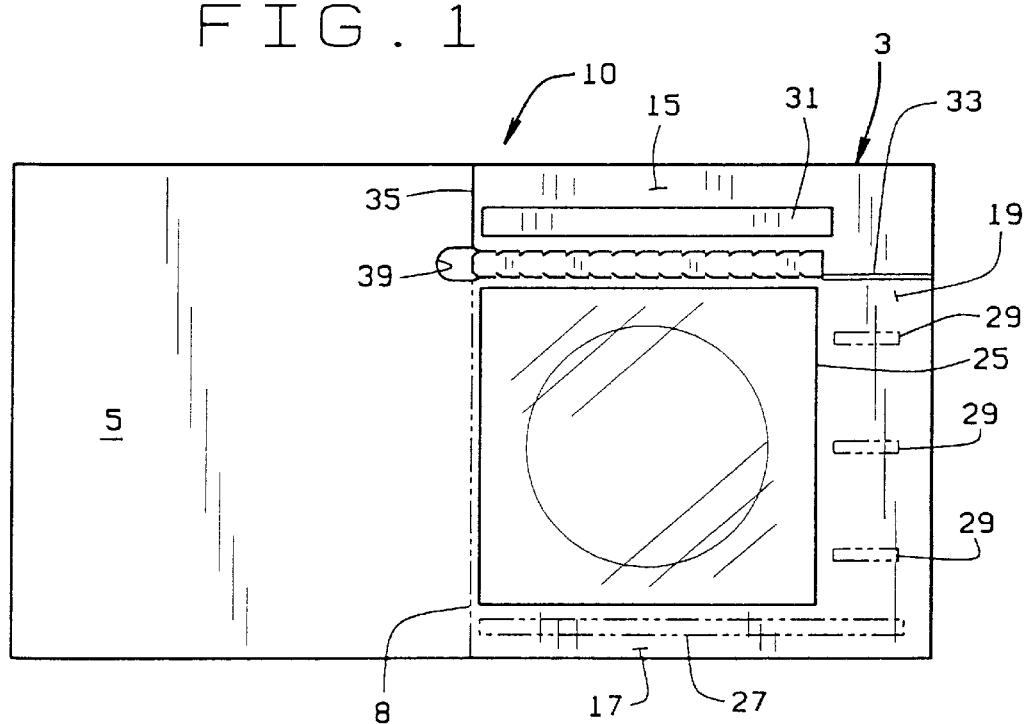
Figure 3:
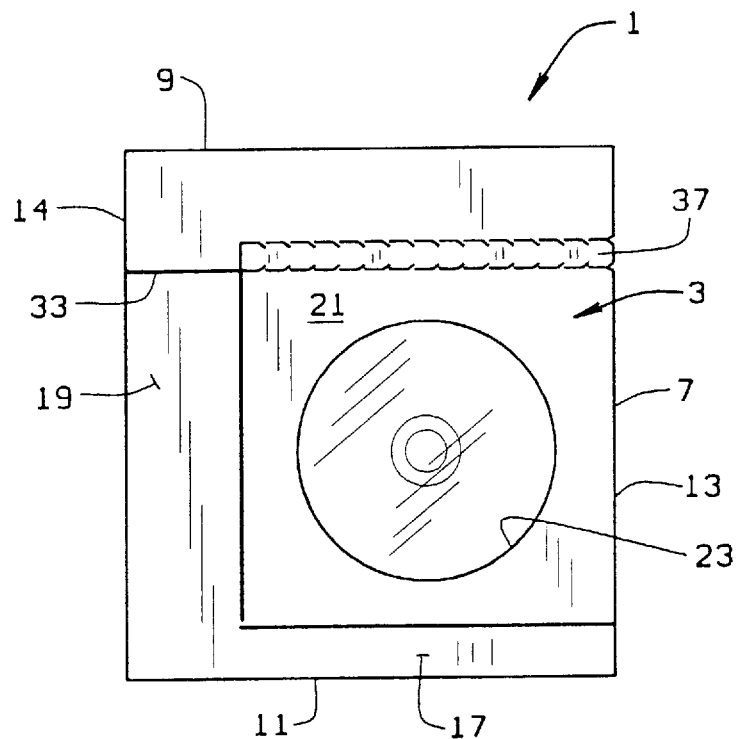
FIG. 3 is a plan view of the envelope when formed.

The envelope 1 has a front panel 3 and a back panel 5 joined along a folded edge 7 defined by a fold line 8 in the blank 10 (FIG. 2) from which the envelope is formed. The envelope 1 also includes a top edge 9, a bottom edge 11, and side edges 13 and 14. The folded edge 7 defines the side edge 13 of the envelope 1. The front panel 3 includes a top margin 15, a bottom margin 17, and a side margin 19. The side margin 19 extends along the side edge 14. The margins 15, 17, and 19 are sized such that the remaining area 21 inside of the margins is sufficiently large to accept a standard CD or computer disk. A circular cutout 23 is formed in the center of area 21 and is covered with a cellophane or clear plastic sheet 25 to form a window so that the CD or computer disk packaged in the envelope 1 can be seen.

The envelope is open along its top edge 9, and sealed along its side edge 14 and bottom edge 11. A glue line 27 extends substantially along the length of the bottom margin 17 on the inner surface of the front panel 3. A glue line 29 is also provided in margin 19. The glue line 29 extends along margin 19 and stops short of the top margin 15. The glue line 29 is shown in the drawings as three spaced-apart glue lines which are parallel to the glue line 27. Providing the glue lines 27 and 29 so that they are parallel to each other makes printing of the glue lines simpler. However, the glue line 29 may also be perpendicular to the glue line 27, so that it is generally parallel to the side 14 of the envelope 1. The glue used for the glue lines 27 and 29 is preferably a pressure activated adhesive, but other adhesives will work equally as well. As can be appreciated, when the blank is folded along the fold line 7, the envelope will be sealed along its sides and bottom, and will be open along its top to allow a CD or computer disk to be inserted into the area 21. The side 14 and bottom 11 are sealed by their respective glue lines in the margins 17 and 19. The side 13 is formed by folding the blank, as noted above, and is sealed by the nature of being formed from a fold.

Figure 4:
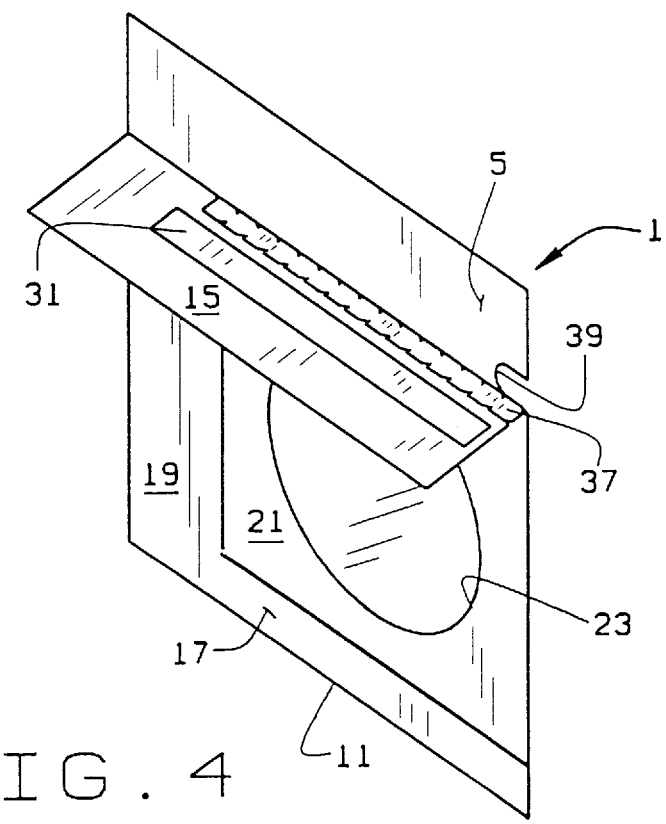
FIG. 4 is perspective view of the envelope opened to accept a disc.

A peel-and-seal type tape strip 31 is provided in the margin 15 beneath the top edge 9 of the carrier. Once a disc has been inserted in the envelope 1, the protective covering of the tape strip is removed, and the top margin 15 is sealed. Thus, all four edges of the envelope will be sealed. To make insertion of the disc easier, and to facilitate removal of the cover of the tape strip 31 to seal the top edge of the envelope 1, a fold line 33 extends between the two sides 13 and 14 of the envelope at the top of the area 21. The blank 10 is also sliced along a line 35 which is co-linear with the fold line 7. The slice 35 extends from the top of the blank to the bottom of the margin 15. Thus, when the envelope is formed, the top margin 15 can be folded upwardly or outwardly (i.e., away from the back panel 5), as shown in FIG. 4, to allow for operation of the tape strip and easier access to the area 21.

A tear strip 37 is also formed in the front panel 3 to facilitate opening of the envelope so that the disc packaged therein can be easily removed. The tear strip 37 preferably extends from the folded edge 7 (i.e., the fold line 8) to the side margin 19 across the top of area 21. Thus, the bottom of the tear strip 37 also forms part of the fold line 33. A small cutout 39 is formed in the back panel 5 to make grasping of the tear strip easier.

When the envelope 1 is formed, and a CD is inserted and sealed in the envelope, the envelope can be bound into the spine S of a perfect bound publication P. The side margin 19 is sufficiently wide to enable easy access to the envelope and operation of the tear strip 37. Preferably, the side margin 19 is approximately 2" wide. Thus, the disc will not be too close to the bound edge of the publication P. This will prevent bending of the disc 2 when the publication P is opened.

In view of the above, it will be seen that the several objects and advantages of the present invention have been achieved and other advantageous results have been obtained. As various changes could be made in the above constructions without departing from the scope of the invention, it is intended that all matter contained in the above description or shown in the accompanying drawings shall be interpreted as illustrative and not in a limiting sense. Although the top edge is the opened edge, as formed, any of the edges can define the opened edge. Further, the tear strip can be formed in any of the margins. Preferably, however, the tear strip would not be formed in the margin 19 which is bound into the publication.

We claim:

1. An envelope adapted to hold a CD or computer disc and being adapted to be bound into a spine of a publication; the envelope being formed from a blank and having a front face, a back face, and four side edges, a fold line provided between the front face and back face and laterally thereof to allow said faces to fold into overlying relationship; a first edge being formed at the said fold line in said blank, a first margin provided adjacent the second side edge, disposed opposite the said fold line, a second margin adjacent a third side edge, said second margin being arranged downwardly of said front and back faces of the formed envelope, and a third margin formed adjacent the fourth side edge, of said third margin arranged upwardly of said faces, said margins defining an area between the front and back faces sized to accept a disc; said first and second margins including adhesive strips intermediate said front and back faces to secure said front and back faces together such that said envelope is sealed along three edges and has an opened upper edge; said third margin being adjacent said opened edge and provided upwardly of said front and back faces to allow insertion of a disc therein; a flap provided in said third margin in said front face of said envelope, said flap being generally parallel to said fourth and bottom edge of said envelope; an adhesive strip having a coating in said third margin intermediate the front and back face, said coating being removable from said adhesive strip to seal said fourth edge of said envelope into closure; and a tear strip provided in said third margin spaced from said adhesive strip, said tear strip being laterally disposed and operable to open said envelope to provide removal of a disc.

2. The envelope of claim 1 and wherein said envelope is formed from paperboard.

3. The envelope of claim 2 and wherein said front face having a cutout formed therein, and a layer of one of cellophane or clear plastic sheet provided therein to form a window for viewing of any disc disposed within the envelope.

* * * * *